(12) United States Patent
Guan et al.

(10) Patent No.: US 9,870,309 B2
(45) Date of Patent: Jan. 16, 2018

(54) VARIABLE TRACKING IN PROGRAM DEBUGGING

(71) Applicant: International Business Machines Corporation, Armonk, NY (US)

(72) Inventors: Xiao F. Guan, Shanghai (CN); Jinsong Ji, Ponte Vedra, FL (US); Yi Z. Mao, Shanghai (CN); Yuheng Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 14/919,938

(22) Filed: Oct. 22, 2015

(65) Prior Publication Data

US 2016/0154726 A1 Jun. 2, 2016

(30) Foreign Application Priority Data

Nov. 28, 2014 (CN) .......................... 2014 1 0710926

(51) Int. Cl.
G06F 9/44 (2006.01)
G06F 11/36 (2006.01)

(52) U.S. Cl.
CPC ................ *G06F 11/3636* (2013.01)

(58) Field of Classification Search
CPC ................................. G06F 11/3636
USPC ..................................... 717/128
See application file for complete search history.

(56) References Cited

U.S. PATENT DOCUMENTS

| 6,993,749 | B2 | 1/2006 | Bates et al. |
| 7,603,659 | B2 | 10/2009 | Blumenthal et al. |
| 8,032,868 | B2* | 10/2011 | Bates ................ G06F 11/3636 714/39 |
| 8,645,761 | B2 | 2/2014 | Barman et al. |
| 8,881,116 | B2* | 11/2014 | Mulat ................ G06F 11/3608 717/126 |
| 2003/0041315 | A1 | 2/2003 | Bates et al. |
| 2008/0127113 | A1* | 5/2008 | Wu ..................... G06F 11/3644 717/129 |

(Continued)

OTHER PUBLICATIONS

Kosmatov et al., A Lesson on Runtime Assertion Checking with Frama-C, Retrieved from Internet URL: http://kosmatov.perso.sfr.fr/nikolai/publications/kosmatov s rv 2013 pdf, 14 pages.

(Continued)

*Primary Examiner* — Ted T Vo
*Assistant Examiner* — Lanny Ung
(74) *Attorney, Agent, or Firm* — Schmeiser, Olsen & Watts, LLP; John Pivnichny

(57) ABSTRACT

A method and system for structuring program code to implement program debugging of the program code using tracking of variables. A first variable to be tracked and a first expression associated with the first variable are determined. The program code includes the first variable and the first expression. A reverse scanning of the program code is performed to search for a first assignment expression within a first assignment statement that assigns a value of the first assignment expression to the first variable. In response to finding the first assignment expression via the reverse scanning, a first watch point for determining a true/false value of the first expression is inserted into the program code after the first assignment statement.

17 Claims, 5 Drawing Sheets

(56) References Cited

U.S. PATENT DOCUMENTS

2012/0278791 A1  11/2012  Geist
2013/0339929 A1  12/2013  Logozzo et al.

OTHER PUBLICATIONS

Auguston, Mikhail, Assertion checker for the C programming language based on computations over event traces, AADEBUG'2000, 10 pages.

* cited by examiner

```
200 ─┐
    void police_chase(){
        int suspect, show;
        ...
        if (condition == true)
            suspect = find_suspect();      ─212
        else
            suspect = show;                 ─214
        suspect = suspect + 2;              ─216
218─ sentence (suspect, year_calculated);
    }
                                                     ─210 int sentence(int guy, int year){
        assert (guy >= 0);   ─225
    ...
    }
                                                     ─220 int find_suspect(){
        int candidate;
        candidate = check_candidate();   ─235
        ...
        return candidate;
    }
                                                     ─230
```

500 ─┐

```
void police_chase(){
    int suspect, show;
    ...
    if (condition == true)                          ←210
        suspect = find_suspect();
        assert (suspect + 2 >= 0);    ←510
    else
        suspect =  show;
        assert (suspect + 2 >= 0);    ←520
    suspect = suspect + 2;
    assert (suspect>=0);              ←530
    sentence (suspect, year_calculated);
} int sentence(int guy, int year){
    assert (guy >= 0);                              ←220
    ...
} int find_suspect(){
    int candidate;
    candidate = check_candidate();
    assert (candidate + 2 >= 0);    ←540    ←230
    ...
    return candidate;
}
```

FIG. 5

```
600
int find_suspect(){
    int candidate;
    while (some_cond){
        change_condition(cond);
        if(cond)
            val = val + 1;
    }
    assert (val > 0);
}
```
─610

VARIABLE TRACKING IN PROGRAM DEBUGGING

TECHNICAL FIELD

The present invention relates to the field of program development, and more specifically, relates to variable tracking in program debugging.

BACKGROUND

During the program development, a programmer needs to debug the program being coded to find grammatical and/or logical error in the source code. A debugger is a common tool for performing debugging. For example, a dedicated debugger is usually provided in an integrated development environment (IDE). During the debugging process, tracking may of variables may need to be performed.

Specifically, during a debugging process, a programmer often needs to check whether a value of a given variable is located within expected range. At present, a watch point may be used to track a value of a variable. Considering C or C++ language as an example, a programmer may use a statement such as "assert" to suspend running of a program at a designated location. Then, a debugger may obtain a value actually stored in a storage address assigned to a variable to be checked, to be available for a user to look up. The watch point is substantively an internal memory break point. In this way, the programmer may look up a value of the variable and other relevant information.

Then, in a traditional solution, in order track a change of a variable value, the programmer must set a watch point for all assignment expressions that might change the variable value in the program. Moreover, assignment expressions that might affect the variable values are usually applied to different variables and/or located in different functions, which not only increases the burden of a programmer, but also is adverse to automation of the variable tracking process. Moreover, before finding the root of unexpected change of a variable value, execution of the program would be possibly interrupted for multiple times.

SUMMARY

The present invention provides a method and associated system of variable tracking in program debugging. A first variable to be tracked and a first expression associated with the first variable to be watched are determined. A reverse scanning of the debugged program code is performed to search for an assignment expression that assigns a value to the first variable. In response to finding the value assignment expression, a watch point associated with the first expression is set after an assignment statement including the assignment expression to check whether the first expression stands.

The present invention provides a method and associated system for structuring program code to implement program debugging of the program code using tracking of variables. A processor determines a first variable to be tracked and a first expression associated with the first variable, the program code comprising the first variable and the first expression. A reverse scanning of the program code is performed to search for a first assignment expression within a first assignment statement that assigns a value of the first assignment expression to the first variable. In response to finding the first assignment expression via the reverse scanning, the processor inserts, into the program code after the first assignment statement, a first watch point for determining a true/false value of the first expression.

BRIEF DESCRIPTION OF THE DRAWINGS

Through the more detailed description of some embodiments of the present disclosure in the accompanying drawings, the above and other objects, features and advantages of the present disclosure will become more apparent.

FIG. 5 shows a schematic diagram of a program code segment being processed, in accordance with embodiments of the present invention.

Throughout the drawings, same or like reference numerals are used to represent the same or like components.

DETAILED DESCRIPTION

Some embodiments will be described in more detail with reference to the accompanying drawings, where the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In general, embodiments of the present invention provide a technical solution for variable tracking in program debugging.

In one aspect of the present invention, there is provided a method for variable tracking in a program debugging. The method comprises: determining a first variable to be tracked and a first expression associated with the first variable to be watched; performing a reverse scanning to the program code to be debugged to search for an assignment expression that assigns a value to the first variable; and in response to finding the value assignment expression, after an assignment statement including the assignment expression, setting a watch point associated with the first expression to check whether the first expression is true.

In another aspect, there is provided a system for variable tracking in a program debugging. The system comprises: a target determining unit configured to determine a first variable to be tracked and a first expression associated with the first variable to be watched; a scanning unit configured to perform a reverse scanning to the program code to be debugged to search for an assignment expression that assigns a value to the first variable; and a watch point setting unit configured to, in response to finding the value assignment expression, after an assignment statement including the assignment expression, setting a watch point associated with the first expression to check whether the first expression is true.

According to embodiments of the present invention, the debugger can automatically add a watch point, to find a cause for abnormality of a variable. Other features and advantages of the present invention will become easily comprehensible through the description below.

Figure 1:
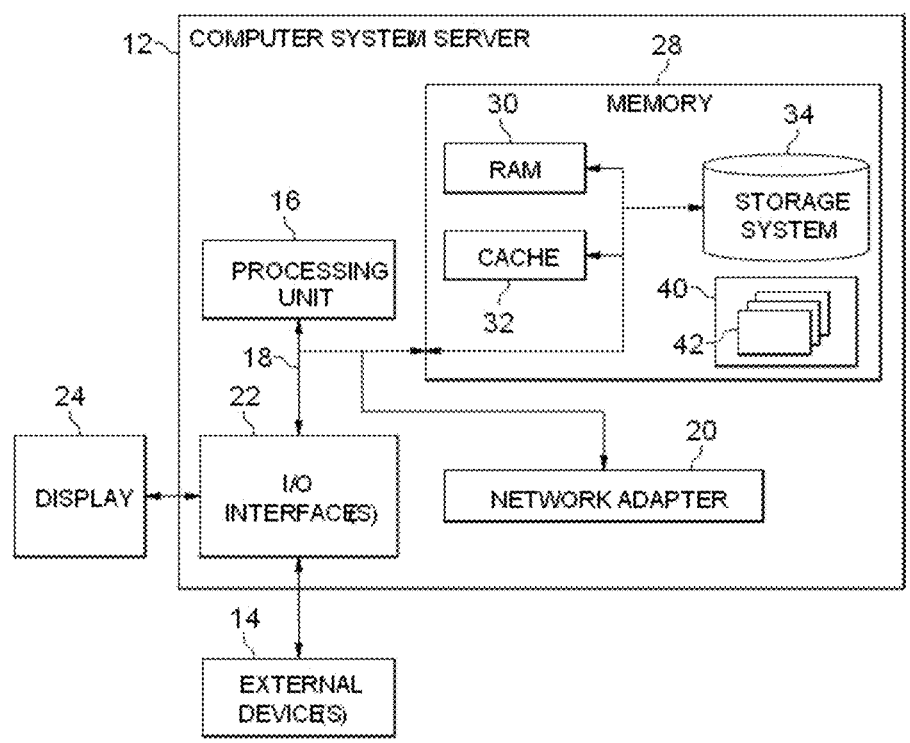
FIG. 1 shows an exemplary computer system/server which is applicable to implement embodiments of the present invention.

Referring now to FIG. 1, where an exemplary computer system/server 12 which is applicable to implement embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Hereinafter, the mechanism and principle of embodiments of the present invention will be described in detail. Unless otherwise stated, the term "based on" used hereinafter and in the claims expresses "at least partially based on." The term "comprise" or "include" or a similar expression indicates an open inclusion, i.e., "including, but not limited to . . . ." The term "plural" or a similar expression indicates "two or more." The term "one embodiment" indicates "at least one embodiment." The term "another embodiment" indicates "at least one another embodiment." Definitions of other terms will be provided in the description below.

In addition, terms such as "first," "second," and "third" used herein are only for the convenience of reference, not intended to impose any limitation to the described objects in terms of sequence or time. Moreover, unless otherwise indicated, these termism do not necessarily have to refer to different objects. For example, "a first expression" and "a second expression" may be different expressions or identical expressions.

In order to illustrate the mechanism and principle of the present invention more clearly, it will be described first how to implement variable tracking (i.e., tracking of variables) in a traditional solution. See FIG. 2. A program code segment 200 compiled with C++ language includes function police_chase 210, function statement 220, and function find_suspect 230. The function statement 220 uses two integer (int) variables guy and year as parameters. In the function police_chase 210, the function statement 220 is invoked with the integer variable suspect as the parameter.

In the function statement 220, a watch point is set at statement 225 to check whether a value of the variable guy is greater than or equal to 0. In this example, the assert statement "assert" is inserted into a program code. Therefore, execution of the program will be interrupted here, such that the debugger may obtain a value actually stored in a storage address of the variable guy to be checked. The working principle of the assert statement is known in the art, which will not be detailed here. In other words, if the value of the variable guy is less than 0 at the statement 225, the value of guy is considered to be an abnormality.

If the debugger finds abnormality at the watch point of the statement 225, in a traditional solution, it is needed to set a watch point at all locations that likely change the guy value and assignment statements that can affect the guy value, to find a cause for the abnormality. For example, in the function police_chase 210, at statements 212, 214 and 216, the value of the variable suspect is likely changed or affected, thereby affecting the value of the variable guy in the function statement 220. Therefore, a plurality of watch points need to be set to track the variable suspect.

Moreover, it may be seen that the statement 212 invokes another function find_suspect 230 to assign values to the variable suspect. In the function find_suspect 230, the value of the integer variable candidate is a return value of the function. Therefore, in the function find_suspect 230, it is needed to set watch points at the statement 235 assigning a value to the variable candidate and any other assignment statement that may change the value of the variable candidate.

In this traditional solution, the programmer has to add these watch points manually. The reason is that no currently known debugger or debugging script can determine the association between the variables guy, suspect and candidate across functions. Therefore, the monitoring point cannot be automatically added to a correct location. Moreover, suppose the cause for the abnormality of the variable suspect is statement 216. At this point, all interruptions of program execution caused by the watch points set at various locations before the statement (e.g., statements 212 and 214) will increase the burden of the programmer during the debugging process, thereby causing the debugging process to be very troublesome.

Figures 2, 3:
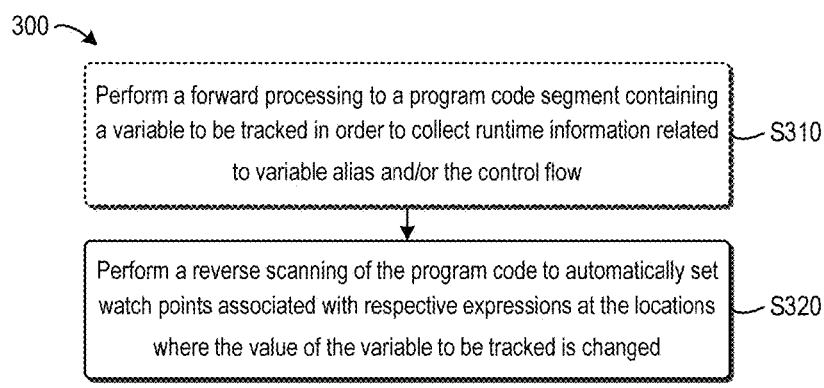
FIG. 2 shows a schematic diagram of a program code segment containing a variable to be tracked, in accordance with embodiments of the present invention.
FIG. 3 shows a schematic flow diagram of a method for variable tracking in program debugging, in accordance with embodiments of the present invention.

In order to solve the above and other potential problems, embodiments of the present invention provide a variable tracking method (i.e., a method for tracking variables) in program debugging. Refer to FIG. 3, in which an exemplary flow diagram of a method 300 for variable tracking in program debugging according to an exemplary embodiment of the present invention is presented. In one embodiment, the method 300 may be invoked and executed by a debugger. The method 300 provides a high level overview of a mechanism for variable tracking provided by the present invention. In one embodiment, the method 300 structures program code to implement program debugging of the program code using tracking of variables.

The method 300 starts from step S310, where a forward processing is performed to a program code segment containing a variable(s) to be tracked in order to collect runtime information associated with alias of the variables and/or the control flow for an assignment statement. In this way, error or missing possibly occurring due to variable alias and/or control flows (e.g., loops) during the automatic setting procedure of the watch points may be avoided. Specific implementation of step S310 will be described in detail below.

It would be appreciated that step S310 is optional and is thus illustrated in dotted-lines in the figure. For example, when the variables to be tracked do not have alias and/or the program segments do not include control flows such as loops, the step S310 may be omitted.

In step S320, a reverse scanning is performed in the program code to automatically set watch points for respective expressions at each location where the value of the variable to be tracked is changed. According to embodiments of the present invention, the step S310 for collecting runtime information is executed according to an execution order of the program. In some cases, the step may also be executed according to the code sequence. On the contrary, according to embodiments of the present invention, step S320 is performed according to the execution sequence of the program or in an order reverse to the code sequence.

According to embodiments of the present invention, in a function body of a function, the reverse scanning performs scanning in an order from the last line of code to the first line of code. Between different functions, scanning is performed in an order reverse to the function invoking sequence. For example, as already known, when the program is executed, a runtime stack will be created. The function involved during the program execution process is pressed into the stack according to the invoking sequence. In one embodiment, scanning is performed in a relevant function in succession according to an order from a stack top to a stack bottom of the function runtime stack.

According to embodiments of the present invention, through reverse scanning of the code, a watch point for an appropriate expression may be inserted at an appropriate position based on an assignment expression associated with the variable to be tracked in the code. In particular, by adaptively updating the expression and/or variable as the scanning target based on the assignment expression, a cause for the variable value abnormality can be detected timely and accurately.

Figure 4:
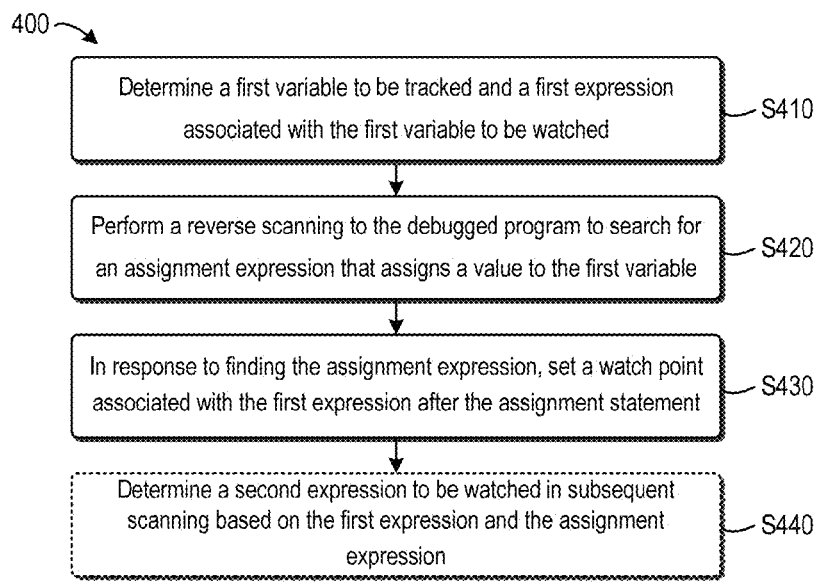
FIG. 4 shows a schematic flow diagram of a method for variable tracking in program debugging, in accordance with embodiments of the present invention.

Step 320 in the method 300 will be described in detail with reference to FIG. 4. In other words, the method 400 described with reference to FIG. 4 is a specific implementation of the step S320. As shown in the figure, the method 400 starts from step S410, where a variable to be tracked (called "a first variable") and an expression associated with the first variable to be watched (called "a first expression") are determined. The program code comprises the first variable and the first expression.

According to embodiments of the present invention, when the method 400 is first executed, the first expression, for example, may be assigned by a user. In one embodiment, the first expression may be an expression associated with a variable value abnormality detected during the debugging process. For example, if the programmer finds that a certain expression causes a value of a variable to be abnormal during the program debugging process, he/she may provide, to the debugger, information that can uniquely identify the first variable and the first expression. As an example, a user may select a first expression and a first variable in IDE through a pointing device such as a mouse. Alternatively or additionally, the user may also enter manually the first variable and the first expression in a designated input domain provided by the debugger. Any other manner is feasible.

With reference to the example shown in FIG. 2, a user may indicate to a debugger that the first variable to be tracked is suspect, and the first expression associated with the variable to be watched is "suspect>=0." The user may also input the position of the first expression in the function police_chase, e.g., a row number, to uniquely locate the first expression. Therefore, the first variable suspect is a target variable to be tracked, and the first expression "suspect>=0" is a target expression to be watched.

The method 400 proceeds to step S420, where a reverse scanning is performed to the debugged program. As mentioned above, in one embodiment, the reverse scanning performs scanning to the code in an order reverse to the execution sequence of the program. Alternatively, the scanning may also be performed according to an order reverse to the code sequence. A target of the reverse scanning is searching for an expression for assigning a value to the first variable, called "assignment expression." In one embodiment, the reverse scanning of the program code searches for a first assignment expression within a first assignment statement that assigns a value of the first assignment expression to the first variable.

As an example, in an advanced program language such as C/C++, the assignment expression may include an operation formula. Generally speaking, in a program statement, if the target variable to be tracked (i.e., first variable) is located at the left side of the equal sign, it may be regarded that the expression at the right side of the equal sign is an assignment expression. For example, in the assignment statement "A=B+C" the expression "B+C" is an assignment expression whose value is assigned by the assignment operator "=" to the first variable A. In particular, the assignment expression may be an individual variable. For example, in the assignment statement "A=B," the individual variable B may be regarded as an assignment expression assigned to the first variable A. Alternatively or additionally, the assignment expression may contain function invoking or any other expression capable of changing the value of the first variable. The embodiment in this aspect will be discussed below. During the program running process, the assignment expression may be converted into an assembly language expression similar to "r3=r1+r2," "mv r3, r2" as is known in the art.

In the example shown in FIG. 2, in the reverse scanning of the function police_chase, it may be determined that the statement 216 is an assignment statement involving a first variable suspect. In the assignment statement 216, the expression "suspect+2" is an assignment expression.

The method 400 then proceeds to step S430, where in response to finding the assignment expression, after the assignment statement containing the assignment expression, a watch point associated with the first expression is set. As already known, the objective of setting a watch point is for checking, at the position, whether the first expression to be watched is true. In the example shown in FIG. 2, after the statement 216, a watch point associated with the first expression "suspect>=0" is inserted. With the C/C++ language as an example, an assert statement "assert (suspect>=0)" may be inserted after the statement 216, thereby completing the setting of the position of the watch point. In one embodiment for step S430, in response to finding the first assignment expression via the reverse scanning, a first watch point is inserted into the program code for determining a true/false value of the first expression, wherein inserting the first watch point into the program code comprises inserting the first watch point after the first assignment statement.

It would be appreciated that setting of the monitoring point does not necessarily depend on the assert statement; instead, it may vary with different programs and/or different programming languages. The scope of the present invention is not limited in this aspect. Additionally, the insert position of the watch point is not compulsorily located immediately after the assignment statement. For example, in one embodiment, the watch point as set and the assignment statement may be spaced with one or more other statements prior to the inserted "assert" statement, as long as these one or more other statements will not affect the value of the first variable. The scope of the present invention will not be limited in this aspect.

By setting this watch point, the debugger may determine whether the expression "suspect>=0" is true after the statement 216 and before the statement 218 since statement 218 may change the value of "suspect". If the expression "suspect>=0" is not true (i.e., false), the expression "guy>=0" in the function statement 220 will surely not be true. Therefore, the assignment statement 216 may be determined as a cause for abnormality of the value of the variable guy.

Continue reference to FIG. 4. In some cases, for example, when the searched assignment statement is determined as a cause for the variable value abnormality, the method 400 may end now. In some other cases, a reverse scanning might be needed to continue execution of the program code, called "subsequent reverse scanning." At this point, the method 400 may proceed to an optional step S440 (shown in dotted-line in the figure), where a second expression is determined based on the first expression and the assignment expression. The second expression will be used as a watch target in the subsequent reverse scanning performed in the next step. In particular, according to embodiments of the present invention, the obtained second expression is associated with the first expression semantically. More specifically, the semantics of the second expression before the assignment statement containing the assignment expression is equivalent to the semantics of the first expression after the assignment statement.

In one embodiment, a second expression associated with the first variable to be watched is determined and a second watch point for determining a true/false value of the second expression is inserted into the program code, wherein inserting the second watch point into the program code comprises inserting the second watch point before the first assignment statement such that the first expression and the second expression are semantically equivalent.

Still consider the specific example of FIG. 2. As mentioned above, the first variable is "suspect," the first expression is "suspect>=0," and the assignment expression is "suspect+2." It may be seen that the variable contained in the assignment expression is only the first variable. In other words, the assignment expression does not contain other variables than the first variable. In this case, in one embodiment, it is possible to replace the first variable in the first expression with the assignment expression to obtain the second expression. More specifically, in this example, the first variable "suspect" in the first expression "suspect>=0" is replaced with the assignment expression "suspect+2." Therefore, the resulting second expression is "suspect+2>=0."

In this example, the assignment statement including the assignment expression "suspect+2" is the statement 216. The semantics of the second expression "suspect+2>=0" before the assignment statement 216 is equivalent to the semantics of the first expression "suspect>=0" after the assignment statement 216. In other words, if the expression "suspect+2>=0" is true before the statement 216, then the expression "suspect>=0" is also true after the statement 216; vice versa. Such semantic equivalence guarantees the correctness and validity of the expression watch. Definitionally, two expressions E1 and E2 appearing in source code of a computer program are semantically equivalent or semantically identical if: (i) E1 and E2 both explicitly appear in different program statements; ii) there is an execution path at runtime from E1 to E2. (or E2 to E1) and (iii) evaluating E1 and E2 would result in a same value if the program follows the execution path to run sequentially at runtime.

In particular, in one embodiment, the debugger may perform a code outline technology through an assignment value expression, to achieve change of the monitored expression. In addition, in some cases, when determining the second expression, the variable to be tracked might be needed to be updated. The embodiment in this aspect will be described with reference to a specific example below.

It would be appreciated that in some cases, during reverse scanning of the program code, the method 400 may be iteratively executed one or more times. For example, in the example shown in FIG. 2, the method 400 may start from the statement 216 to continue performance of the reverse scanning upward. At this point, the second expression determined at the current step S440 will be used as a watch target in the subsequent reverse search.

In the example shown in FIG. 2, the method 400 starts continuance to perform the reverse scanning upward from the statement 216. In other words, the method 400 is performed for the second time. At this point, it may be determined at step S410 that the first variable is still "suspect" (the variable to be tracked that was not updated in the previous performing process), and the first expression associated therewith is the second expression "suspect+2>=0" determined at step S440 during the preceding iteration of execution of the method 400.

In step S420, a statement assigning a value to the variable "suspect" is searched upward from the statement 216. In response to finding the assignment expression "show" included in the assignment statement 214, in step S430, a watch point associated with the first expression "suspect+2" is set after the assignment statement 214. For example, in one embodiment, a statement "assert (suspect+2>=0)" may be inserted after the assignment statement 214.

In step S440, a second expression used in subsequent scanning is determined based on the first expression "suspect+2>=0" and the assignment expression "show." At this point, the assignment expression involves a second variable "show" different from the first variable "suspect." According to embodiments of the present invention, in this case, an update to the variable to be tracked will be triggered. Specifically, the target to be tracked in subsequent scanning is updated from the current first variable "suspect" to the second variable "show." In other words, after the next iteration of execution of the method 400, the first variable determined at step S410 will be the second variable "show" in the current iteration.

Accordingly, the previous first variable in the first expression will be substituted by a second variable contained in the assignment expression, thereby generating a second expression as a monitoring target in the subsequent scanning. In this example, the first variable "suspect" in the first expression "suspect+2>=0" is replaced by the second variable "show." Therefore, the resulting second expression is "show+2>=0."

It would be appreciated that in some cases, an assignment expression found in the reverse scanning of the current iteration likely simultaneously involves the currently tracked first variable and a second variable different from the first variable. At this point, in one embodiment, the first variable and the second variable may be tracked in the subsequent reverse scanning.

Update of the first variable as the tracking target may not only be triggered by a simple assignment expression included in the statement 214, but also may be triggered by an assignment function. For example, in the example shown in FIG. 2, in the subsequent scanning, it may be determined that the next assignment statement is the statement 212. In the assignment statement 212, the assignment expression for assigning a value to the first variable "suspect" is an assignment function "find_suspect( )," and what is returned by the function find_suspect 230 is the variable candidate different from suspect.

At this point, in one embodiment, the assignment expression is regarded as involving different variables. In other words, at this point, the variable returned by the assignment function is the second variable. The second variable will be set as a target to be tracked variable in the next iteration.

Correspondingly, at step S440, the first variable in the first expression may be replaced with the second variable, thereby obtaining the second expression to be watched in the subsequent scanning. Specifically, in the example of FIG. 2, the first variable "suspect" in the first expression "suspect+2>=0" is replaced with the second variable "candidate," thereby obtaining the second expression "candidate+2>=0."

Additionally, according to embodiments of the present invention, in response to the assignment expression containing an assignment function, a reversely scanned target function will be updated. Specifically, the assignment function will be determined as a target function for subsequent reverse scanning. As an example, in the example of FIG. 2, the reverse scanning is originally executed in the function police_chase. Namely, the function police_chase is a target function. In response to finding a second expression "find suspect ( )" in the assignment statement 212, the target function is updated from the function police_chase 210 to the function find_suspect 230.

Thus, in the next iteration of execution of the method 400, reverse scanning will be performed in the function find_suspect, wherein the first variable as the tracking target is candidate, and the first expression associated therewith is "candidate+2>=0." In this way, in response to searching the assignment expression assigning a value to the variable candidate at the statement 235 in the function find_suspect, a break point associated with the first expression is inserted after the assignment statement 235, e.g., an assert statement "assert (candidate+2>=0)."

The method may be performed iteratively, until completion of the scanning to the program code to be debugged. In this manner, a watch point may be automatically set in an appropriate location in the program code. During the debugging process, a dynamic tracking of a variable can be implemented effectively and efficiently to find the cause for the variable value abnormality.

As an example, the code segment 200 as shown in FIG. 2 is processed in the method 400, resulting in the code segment 500 as shown in FIG. 5. In the code segment 500, the assert statements 510, 520, 530, and 540 are automatically set watch points.

Now several optional preprocessing for the method 400 will be discussed hereinafter, namely, step S310 in the method 300. In one embodiment, the preprocessing may include an alias processing. It would be appreciated that in the program code, one variable may have one or more variable alias, namely, these variables with different names share the same storage space address. Existence of the alias might cause tracking error. For example, without identifying and tracking the alias variables, the cause for the variable value abnormality may be impossible to be found accurately. In one embodiment in step S310, prior to the reverse scanning, a forward processing of the program code is performed to collect runtime information associated with a control flow for the first assignment statement to avoid an occurrence of an error, due to the control flow, during an automatic setting of the first watch point.

To this end, in one embodiment, before the reverse scanning, the alias variable of the first variable determined at step S410 may be determined in the program code. The alias variable of the first variable in the program code may be determined through any appropriate technical means. For example, it may be determined whether address reference to the first variable exists in the program code. As an example, suppose the first variable is the integer variable a. If there is a further integer variable that is proclaimed to be "int b=&a", then b is a's address reference and is thus an alias variable of a. In other words, modifying the value of the variable b will cause change of the value a.

Alternatively or additionally, it may be further checked whether the program code has a pointer, union, function invoking performed in a manner of transmitting a pointer, local modification to the global variable, and the like, associated with the first variable. If one or more of the above situations exist, it may be regarded that the program code has an alias variable of the first variable.

In response to existence of an alias variable, during reverse scanning, besides the first variable per se, it may also be determined whether an assignment expression for assigning an alias variable exists. For example, in one embodiment, an alias variable table associated with the first variable may be maintained. The alias variable table may record a variable name and its valid naming space of each alias variable. In this way, during reverse scanning, the alias variable may be considered based on the alias variable table. Specifically, if an assignment expression for assigning a value to the alias variable, a corresponding watch point may be inserted after the assignment expression, and optionally, the tracked target variable and watch target expression may be optionally updated. In this way, missing of the cause for variable value abnormality may be presented during the scanning process.

Alternatively or additionally, in one embodiment, the preprocessing at step S310 may also comprise processing of a control flow. It would be appreciated that in the program code, some control flow statements may cause a specific assignment statement to be skipped and/or executed for multiple times. At this point, it would be impossible to accurately determine whether the assignment state is executed and how many times it is executed during a static analysis.

To this end, in one embodiment, for example, a program code may be actually executed during the debugging process. During execution of the program code, runtime information of the control flow associated with the assignment expression for assigning a value to the first variable may be collected. Next, during determining a second expression (step S440) based on the first expression and the assignment expression, the runtime control flow information as collected may be considered.

Only for the purpose of illustration, an example of loop control flow will be discussed with reference to FIG. 6. In the program code 600 shown in FIG. 6, there is a "while" loop block 610. In the loop block 610, when the variable cond is true, the assignment statement "val=val+1" is executed, wherein val is a variable to be tracked. In this case, it would be impossible to determine whether the assignment statement is executed and how many times it is executed through static analysis.

According to embodiments of the present invention, the program code 600 may be actually executed to determine the time number of loop of executing the assignment expression. Therefore, when determining the second expression, the second expression may be determined based on the determined number of loops.

By way of example, suppose that it is found through collecting runtime information that the variable cond is true in the third and fifth iterations, and is false in other cases. Therefore, it may be determined that when the number of iterations is less than 3, the expression to be watched (namely, the second expression) during the subsequent reverse scanning should be "(val+1)+1>0," because the val will be further executed twice thereafter, namely, the variable val will be incremental by 1 for twice. Similarly, it may be determined that when the number of iterations lies between thrice to five times, the second expression is "val+1>0"; and when the number of iterations is greater than or equal to 5 times, the second expression is "val>0."

It is to be understood that the above described while loop is only exemplary, and the scope of the present invention is not limited thereto. On the contrary, runtime information of a control flow associated with any loops may be collected, and such runtime information is utilized to determine the second expression.

Figures 6, 7:
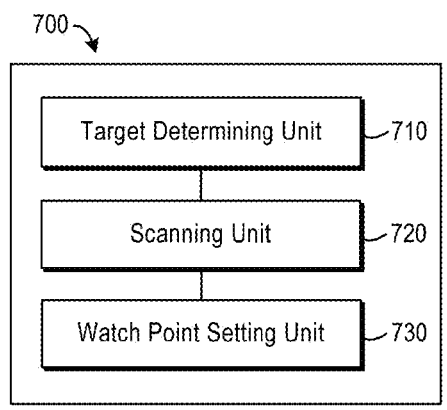
FIG. 6 shows a schematic diagram of a program code segment including a loop structure, in accordance with to embodiments of the present invention.
FIG. 7 shows a schematic block diagram of a system for variable tracking in program debugging, in accordance with embodiments of the present invention.

FIG. 7 shows a schematic block diagram of a system 700 for variable tracking in program debugging according to embodiments of the present invention. As shown in FIG. 7, the system 700 comprises a target determining unit 710 configured to determine a first variable to be tracked and a first expression associated with the first variable to be watched; a scanning unit 720 configured to perform a reverse scanning to the debugged program code to search for an assignment expression that assigns a value to the first variable; and a watch point setting unit 730 configured to set, in response to finding the value assignment expression, a watch point associated with the first expression after an assignment statement including the assignment expression to check whether the first expression is true.

In one embodiment, the system 700 may comprise a target expression updating unit configured to determine a second expression based on the first expression and the assignment expression and to input the second expression to the target determining unit 710 as the first expression to be watched in a subsequent reverse scanning, semantics of the second expression before the assignment statement being identical to semantics of the first expression after the assignment statement.

In one embodiment, the target expression updating unit may comprise a first replacing unit configured to replace, in response to the assignment expression only containing the first variable in the current reverse scanning, the first variable in the first expression with the assignment expression to determine the second expression.

In one embodiment, the system 700 may further comprise a target variable updating unit configured to, in response to the assignment expression searched in the current reverse scanning involving a second variable that is different from the first variable, input the second variable into the target determining unit as the first variable to be tracked in the subsequent reverse scanning. In one embodiment, the second variable may be a variable returned by the assignment function included in the assignment expression. In one embodiment, the target expression updating unit may comprise a second replacing unit configured to replace the first variable in the first expression in the current reverse scanning with the second variable to determine the second expression.

In one embodiment, the currently executed reverse scanning is executed in the current function of the program code, and the assignment expression comprises an assignment function. In this embodiment, the system 700 may also comprise a target function updating unit configured to jump from the current function to the assignment function to perform a subsequent reverse scanning of the program code.

In one embodiment, the system 700 may further comprise an alias variable determining unit configured to determine an alias variable of the first variable in the program code before the reverse scanning, the first variable and the alias variable being associated with a same storage address. In this embodiment, the scanning unit 720 may comprise an alias variable scanning unit configured to search for an assignment expression that assigns a value to the alias variable. In one embodiment, the alias variable determining unit is configured to determine the alias variable based on at least one of the following associated with the first variable: address reference, pointer, union, and a modification to a global variable.

In one embodiment, the system 700 may further comprise a control flow information collecting unit configured to collect runtime information of a control flow associated with the assignment expression before the reverse scanning. In this embodiment, the target expression updating unit may comprise a first updating unit configured to determine the second expression further based on the runtime information.

In one embodiment, the control flow information collecting unit may comprise a loop iteration determining unit configured to determine, in response to the assignment expression being included in the loop control flow, iterations of loops in which the assignment expression is executed. In this embodiment, the first updating unit comprises a second updating unit configured to determine the second expression based on the iterations of the loops.

It should be noted that for the sake of clarity, FIG. 7 does not show optional units or sub-units included in the system 700. All features and operations as described above are suitable for system 700, respectively, which are therefore not detailed here. Moreover, partitioning of units or subunits in system 700 is exemplary, rather than limitative, intended to describe its main functions or operations logically. A function of one unit may be implemented by a plurality of other units; on the contrary, a plurality of units may be implemented by one unit. The scope of the present invention is not limited in this aspect.

Moreover, the units included in the system 700 may be implemented by various manners, including software, hardware, firmware or a random combination thereof. For example, in some embodiments, the apparatus may be implemented by software and/or firmware. Alternatively or additionally, the system 700 may be implemented partially or completely based on hardware. For example, one or more units in the system 700 may be implemented as an integrated circuit (IC) chip, an application-specific integrated circuit (ASIC), a system on chip (SOC), a field programmable gate array (FPGA), etc. The scope of the present intention is not limited to this aspect.

A computer program product of the present invention comprises a computer readable hardware storage device storing computer readable program instructions executable by a processor of a computer system to implement the methods of the present invention.

A computer system of the present invention comprises a processor, a memory, and a computer readable hardware storage device, said storage device containing program instructions executable by the processor via the memory to implement the methods of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for structuring program code to implement program debugging of the program code using tracking of variables, said method comprising:

determining, by a processor, a first variable to be tracked and a first expression associated with the first variable, said program code comprising the first variable and the first expression;

said processor performing a reverse scanning of the program code to search for a first assignment expression within a first assignment statement that assigns a value of the first assignment expression to the first variable;

in response to finding the first assignment expression via the reverse scanning, said processor inserting, into the program code after the first assignment statement, a first watch point for determining a true/false value of the first expression; and prior to said reverse scanning, said processor performing a forward processing of the program code to collect runtime information associated with a control flow for the first assignment statement to avoid an occurrence of an error, due to the control flow, during an automatic setting of the first watch point.

2. The method of claim 1, said method comprising:

said processor determining a second expression associated with the first variable to be watched; and said processor inserting, into the program code a second watch point for determining a true/false value of the second expression, said inserting the second watch point comprising inserting the second watch point before the first assignment statement such that the first expression and the second expression are semantically equivalent.

3. The method of claim 2, wherein the first assignment expression comprises the first variable, and wherein said determining the second expression comprises setting the second expression as the first expression with the first variable in the first expression replaced by the first assignment expression.

4. The method of claim 3, said method comprising:

during said reverse scanning of the program code, said processor finding a second assignment expression within a second assignment statement that assigns a value of the second assignment expression to the first variable, wherein the second assignment expression comprises a second variable to be tracked, wherein the second variable differs from the first variable, and wherein the second assignment statement is before the first assignment statement;

determining, by a processor, a third expression associated with the second variable, wherein said determining the third expression comprises setting the third expression as the second expression with the first variable in the first assignment expression replaced by the second variable; and said processor inserting, into the program code, a third watch point for determining a true/false value of the third expression, said inserting the third watch point comprising inserting the third watch point before the second assignment statement.

5. The method of claim 1, said method comprising:

before said performing the reverse scanning, said processor determining an alias variable of the first variable in the program code, same first variable and the alias variable being associated with a same storage address, during said reverse scanning of the program code, said processor searching for another assignment expression within another assignment statement that assigns the same storage address to the alias variable.

6. The method of claim 5, said method comprising:
  in response to finding the other assignment expression via the reverse scanning, said processor inserting, into the program code, another watch point for determining a true/false value of another expression associated with the alias variable, said inserting the other watch point comprising inserting the other watch point after the other assignment statement.

7. A computer program product, comprising one or more computer readable hardware storage devices storing computer readable program instructions executable by a processor of a computer system to implement a method for structuring program code to implement program debugging of the program code using tracking of variables, said method comprising:
  said processor determining a first variable to be tracked and a first expression associated with the first variable, said program code comprising the first variable and the first expression;
  said processor performing a reverse scanning of the program code to search for a first assignment expression within a first assignment statement that assigns a value of the first assignment expression to the first variable;
  in response to finding the first assignment expression via the reverse scanning, said processor inserting, into the program code, a first watch point for determining a true/false value of the first expression, said inserting the first watch point comprising inserting the first watch point after the first assignment statement; and
  prior to said reverse scanning, said processor performing a forward processing of the program code to collect runtime information associated with a control flow for the first assignment statement to avoid an occurrence of an error, due to the control flow, during an automatic setting of the first watch point.

8. The computer program product of claim 7, said method comprising:
  said processor determining a second expression associated with the first variable to be watched; and
  said processor inserting, into the program code a second watch point for determining a true/false value of the second expression, said inserting the second watch point comprising inserting the second watch point before the first assignment statement such that the first expression and the second expression are semantically equivalent.

9. The computer program product of claim 8, wherein the first assignment expression comprises the first variable, and wherein said determining the second expression comprises setting the second expression as the first expression with the first variable in the first expression replaced by the first assignment expression.

10. The computer program product of claim 9, said method comprising:
  during said reverse scanning of the program code, said processor finding a second assignment expression within a second assignment statement that assigns a value of the second assignment expression to the first variable, wherein the second assignment expression comprises a second variable to be tracked, wherein the second variable differs from the first variable, and wherein the second assignment statement is before the first assignment statement;
  determining, by a processor, a third expression associated with the second variable, wherein said determining the third expression comprises setting the third expression as the second expression with the first variable in the first assignment expression replaced by the second variable; and
  said processor inserting, into the program code, a third watch point for determining a true/false value of the third expression, said inserting the third watch point comprising inserting the third watch point before the second assignment statement.

11. The computer program product of claim 7, said method comprising:
  before said performing the reverse scanning, said processor determining an alias variable of the first variable in the program code, same first variable and the alias variable being associated with a same storage address,
  during said reverse scanning of the program code, said processor searching for another assignment expression within another assignment statement that assigns the same storage address to the alias variable.

12. The computer program product of claim 11, said method comprising:
  in response to finding the other assignment expression via the reverse scanning, said processor inserting, into the program code, another watch point for determining a true/false value of another expression associated with the alias variable, said inserting the other watch point comprising inserting the other watch point after the other assignment statement.

13. A computer system, comprising a processor, a memory coupled to the processor, and a computer readable storage device coupled to the processor, said storage device containing program instructions executable by the processor via the memory to implement a method for structuring program code to implement program debugging of the program code using tracking of variables, said method comprising:
  said processor determining a first variable to be tracked and a first expression associated with the first variable, said program code comprising the first variable and the first expression; said processor performing a reverse scanning of the program code to search for a first assignment expression within a first assignment statement that assigns a value of the first assignment expression to the first variable;
  in response to finding the first assignment expression via the reverse scanning, said processor inserting, into the program code, a first watch point for determining a true/false value of the first expression, said inserting the first watch point comprising inserting the first watch point after the first assignment statement; and
  prior to said reverse scanning, said processor performing a forward processing of the program code to collect runtime information associated with a control flow for the first assignment statement to avoid an occurrence of an error, due to the control flow, during an automatic setting of the first watch point.

14. The computer system of claim 13, said method comprising:
  said processor determining a second expression associated with the first variable to be watched; and
  said processor inserting, into the program code a second watch point for determining a true/false value of the second expression, said inserting the second watch point comprising inserting the second watch point before the first assignment statement such that the first expression and the second expression are semantically equivalent.

15. The computer system of claim 14, wherein the first assignment expression comprises the first variable, and wherein said determining the second expression comprises setting the second expression as the first expression with the first variable in the first expression replaced by the first assignment expression.

16. The computer system of claim 15, said method comprising:
  during said reverse scanning of the program code, said processor finding a second assignment expression within a second assignment statement that assigns a value of the second assignment expression to the first variable, wherein the second assignment expression comprises a second variable to be tracked, wherein the second variable differs from the first variable, and wherein the second assignment statement is before the first assignment statement;
  determining, by a processor, a third expression associated with the second variable, wherein said determining the third expression comprises setting the third expression as the second expression with the first variable in the first assignment expression replaced by the second variable; and
  said processor inserting, into the program code, a third watch point for determining a true/false value of the third expression, said inserting the third watch point comprising inserting the third watch point before the second assignment statement.

17. The computer system of claim 13, said method comprising:
  before said performing the reverse scanning, said processor determining an alias variable of the first variable in the program code, same first variable and the alias variable being associated with a same storage address,
  during said reverse scanning of the program code, said processor searching for another assignment expression within another assignment statement that assigns the same storage address to the alias variable.

* * * * *